(12) United States Patent
Lanciani et al.

(10) Patent No.: US 9,600,823 B2
(45) Date of Patent: Mar. 21, 2017

(54) DATA MINING SYSTEM

(75) Inventors: Kirk Lanciani, Leominster, MA (US);
Nicole Stewart, Auburn, MA (US);
Steve Washington, Milford, CT (US);
Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 161 days.

(21) Appl. No.: 13/092,031

(22) Filed: Apr. 21, 2011

(65) Prior Publication Data

US 2011/0320019 A1 Dec. 29, 2011

Related U.S. Application Data

(60) Provisional application No. 61/327,044, filed on Apr. 22, 2010.

(51) Int. Cl.
*G06Q 30/00* (2012.01)
*G06Q 30/02* (2012.01)
*A63F 13/335* (2014.01)
*A63F 13/85* (2014.01)
*A63F 13/46* (2014.01)

(52) U.S. Cl.
CPC ........... *G06Q 30/02* (2013.01); *A63F 13/335* (2014.09); *A63F 13/85* (2014.09); *A63F 13/46* (2014.09); *A63F 2300/55* (2013.01); *A63F 2300/57* (2013.01); *A63F 2300/6009* (2013.01)

(58) Field of Classification Search
CPC ................ A63F 2300/6009; A63F 9/18; A63F 2009/186; A63F 2009/188; G06F 17/30539; G06F 2216/03; G06Q 10/10

USPC ............................................... 463/25, 42, 29
See application file for complete search history.

(56) References Cited

U.S. PATENT DOCUMENTS

| | | | |
|---|---|---|---|
| 5,916,024 A * | 6/1999 | Von Kohorn | 463/40 |
| 2004/0097287 A1 | 5/2004 | Postrel | |
| 2004/0242332 A1* | 12/2004 | Walker et al. | 463/42 |
| 2006/0111189 A1 | 5/2006 | Winkler | 463/42 |
| 2007/0281285 A1* | 12/2007 | Jayaweera | G09B 7/02 434/156 |
| 2008/0020367 A1* | 1/2008 | Jessop | A63F 3/04 434/350 |

(Continued)

FOREIGN PATENT DOCUMENTS

WO WO-2011133812 A1 10/2011

OTHER PUBLICATIONS

International Application Serial No. PCT/US2011/033490, International Search Report mailed Jun. 28, 2011, 2 pgs.

(Continued)

*Primary Examiner* — James S McClellan
*Assistant Examiner* — Syvila Weatherford
(74) *Attorney, Agent, or Firm* — Schwegman, Lundberg & Woessner, P.A.

(57) ABSTRACT

A data mining system and method retrieve data related to an item from a database. A survey is generated for presentation in a game. The survey includes the retrieved item data and solicits from a user input data pertaining to the retrieved item data. The input data is received from the survey and stored in a database with the item data. The input data is transmitted to the game and incorporated into the game such that the user interacts with the input data as part of playing the game.

18 Claims, 12 Drawing Sheets

(56) References Cited

U.S. PATENT DOCUMENTS

| | | | |
|---|---|---|---|
| 2008/0220876 A1* | 9/2008 | Mehta | G06Q 30/08 463/42 |
| 2008/0306946 A1 | 12/2008 | Wu | |
| 2009/0091087 A1* | 4/2009 | Wasmund | A63F 9/18 273/430 |
| 2009/0118015 A1* | 5/2009 | Chang et al. | 463/42 |
| 2009/0149246 A1* | 6/2009 | Opaluch | 463/29 |
| 2009/0176580 A1* | 7/2009 | Herrmann et al. | 463/43 |
| 2009/0197681 A1* | 8/2009 | Krishnamoorthy et al. | 463/42 |
| 2009/0291755 A1* | 11/2009 | Walker et al. | 463/29 |
| 2009/0305788 A1* | 12/2009 | Bronstein et al. | 463/42 |
| 2010/0262462 A1* | 10/2010 | Tryfon | G06Q 30/0203 705/7.32 |

OTHER PUBLICATIONS

International Application Serial No. PCT/US2011/033490, Written Opinion mailed Jun. 28, 2011, 4 pgs.
"International Application Serial No. PCT/US2011/033490, Preliminary Report on Patentability mailed Nov. 1, 2012", 6 pgs.

* cited by examiner

DATA MINING SYSTEM

CROSS REFERENCE TO RELATED APPLICATIONS

This application claims the benefit under 35 U.S.C. §119 of the filing date of U.S. Provisional Application Ser. No. 61/327,044, filed Apr. 22, 2010, and entitled "DATA MINING SYSTEM," which is incorporated herein by reference in its entirety.

TECHNICAL FIELD

Example embodiments of the present application generally relate to data mining, and more specifically, to a system and method for mining data from online games.

BACKGROUND

Data mining involves the extraction of patterns from large amounts of data. By identifying trends and patterns in data, businesses and other entities may gain market intelligence and insight into their customers' behavior and preferences, thereby enhancing their business operations. Typically, data used in data mining by a business is obtained from physical and/or electronic transactions with the business.

BRIEF DESCRIPTION OF THE DRAWINGS

The embodiments disclosed in the present disclosure are illustrated by way of example, and not by way of limitation, in the figures of the accompanying drawings. Like reference numerals refer to corresponding parts throughout the drawings.

DETAILED DESCRIPTION

The description that follows includes systems, methods, techniques, instruction sequences, and computing machine program products that embody illustrative embodiments of the present disclosure. In the following description, for purposes of explanation, numerous specific details are set forth in order to provide an understanding of various embodiments of the inventive subject matter. It will be evident, however, to those skilled in the art that embodiments of the disclosed subject matter may be practiced without these specific details. In general, well-known instruction instances, protocols, structures, and techniques have not been shown in detail.

Example embodiments described herein provide systems and methods to incorporate data mining mechanisms into a game executing on a third party platform. A survey may be presented in a game executing on the third party platform. The survey may include data related to an item, such as a product, that is retrieved from a database. The survey may solicit from a user input data pertaining to the retrieved item data. The input data is received from the third party platform and stored with the item data in a database. The input data is returned to the third party platform and incorporated into the game such that the user interacts with the input data as part of playing the game.

Figure 1:
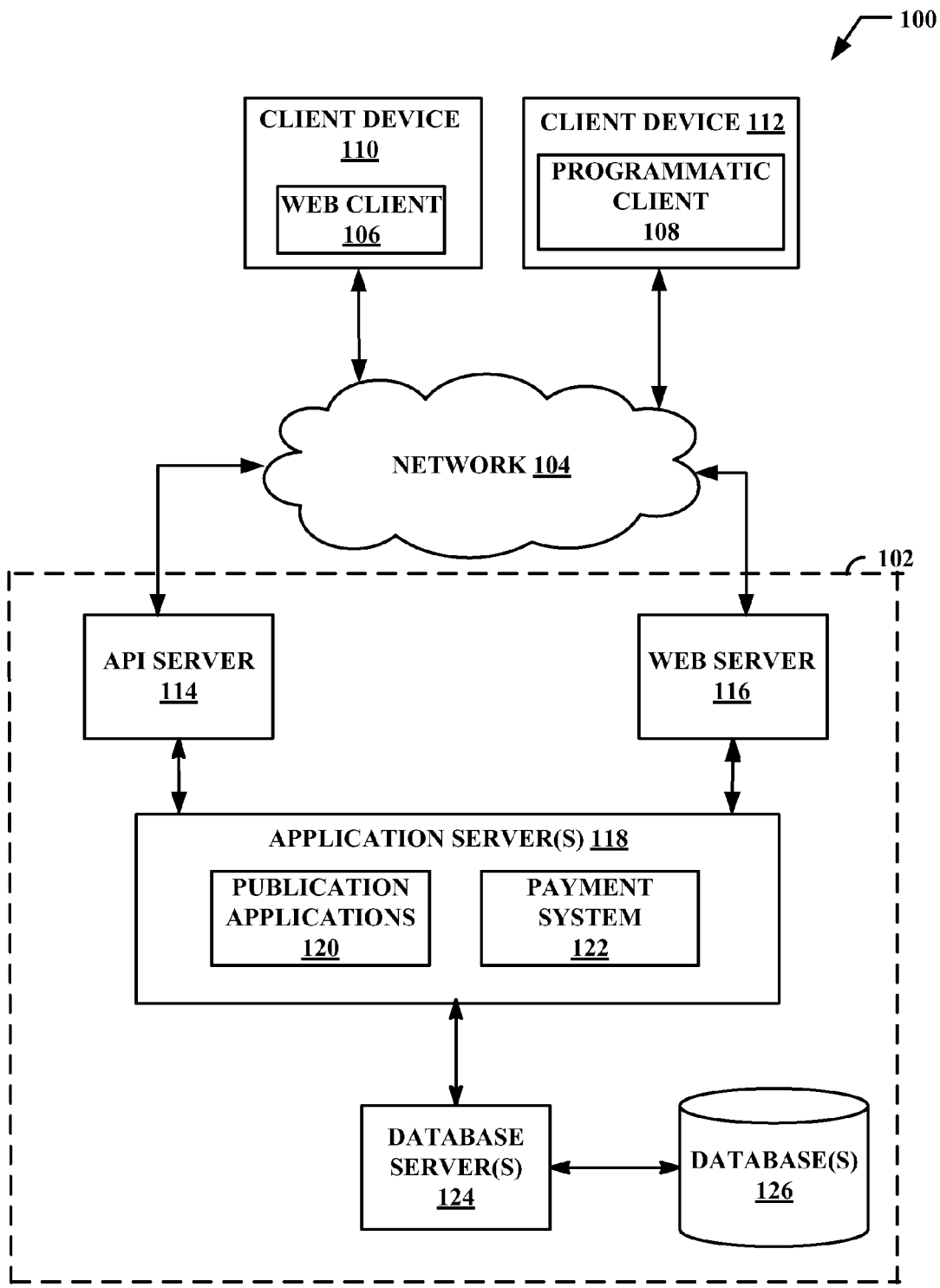
FIG. 1 is a block diagram illustrating a network environment, according to some embodiments.

FIG. 1 is a network diagram depicting a network system 100, according to one embodiment, having a client-server architecture configured for exchanging data over a network. For example, the network system 100 may include a publication/publisher system 102 where clients may communicate and exchange data within the network system 100. The data may pertain to various functions (e.g., online item purchases) and aspects (e.g., managing content) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet, wireless network, cellular network, or a Wide Area Network (WAN)) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user profiles; user attributes; product attributes; product and service reviews; product, service, manufacture, and vendor recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client device, such as a client device 110 using a web client 106. The web client 106 may be in communication with the network-based publisher 102 via a web server 116. The UIs may also be associated with a client device 112 using a programmatic client 108, such as a client application. It can be appreciated in various embodiments the client devices 110, 112 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things. The client devices 110 and 112 may comprise a mobile phone, desktop computer, laptop, or any other communication device that a user may use to access the networked system 102.

Turning specifically to the network-based publisher 102, an application program interface (API) server 114 and a web server 116 are coupled to, and provide programmatic and web interfaces respectively to, one or more application servers 118. The application servers 118 host one or more publication application(s) 120 and one or more payment systems 122. The application servers 118 are, in turn, shown to be coupled to one or more database server(s) 124 that facilitate access to one or more database(s) 126.

In one embodiment, the web server 116 and the API server 114 communicate and receive data pertaining to products, listings, transactions, and feedback, among other things, via various user input tools. For example, the web server 116 may send and receive data to and from a toolbar or webpage on a browser application (e.g., web client 106) operating on a client device (e.g., client device 110). The API server 114 may send and receive data to and from an application (e.g., client application 108) running on another client device (e.g., client device 112).

The publication system 120 publishes content on a network (e.g., the Internet). As such, the publication system 120 provides a number of publication and marketplace functions and services to users that access the networked system 102. For example, the publication application(s) 120 may provide a number of services and functions to users for listing goods and/or services for sale, facilitating transactions, and reviewing and providing feedback about transactions and associated users. Additionally, the publication application(s) 120 may track and store data and metadata relating to products, listings, transactions, and user interaction with the network-based publisher 102. The publication application(s) 120 may aggregate the tracked data and metadata to perform data mining to identify trends or patterns in the data. The publication system 120 is discussed in more detail in connection with FIG. 3. While the publication system 120 is discussed in terms of a marketplace environment, it is noted that the publication system 120 may be associated with a non-marketplace environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal account, or credit card) for purchases of items via the network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

Figure 2:
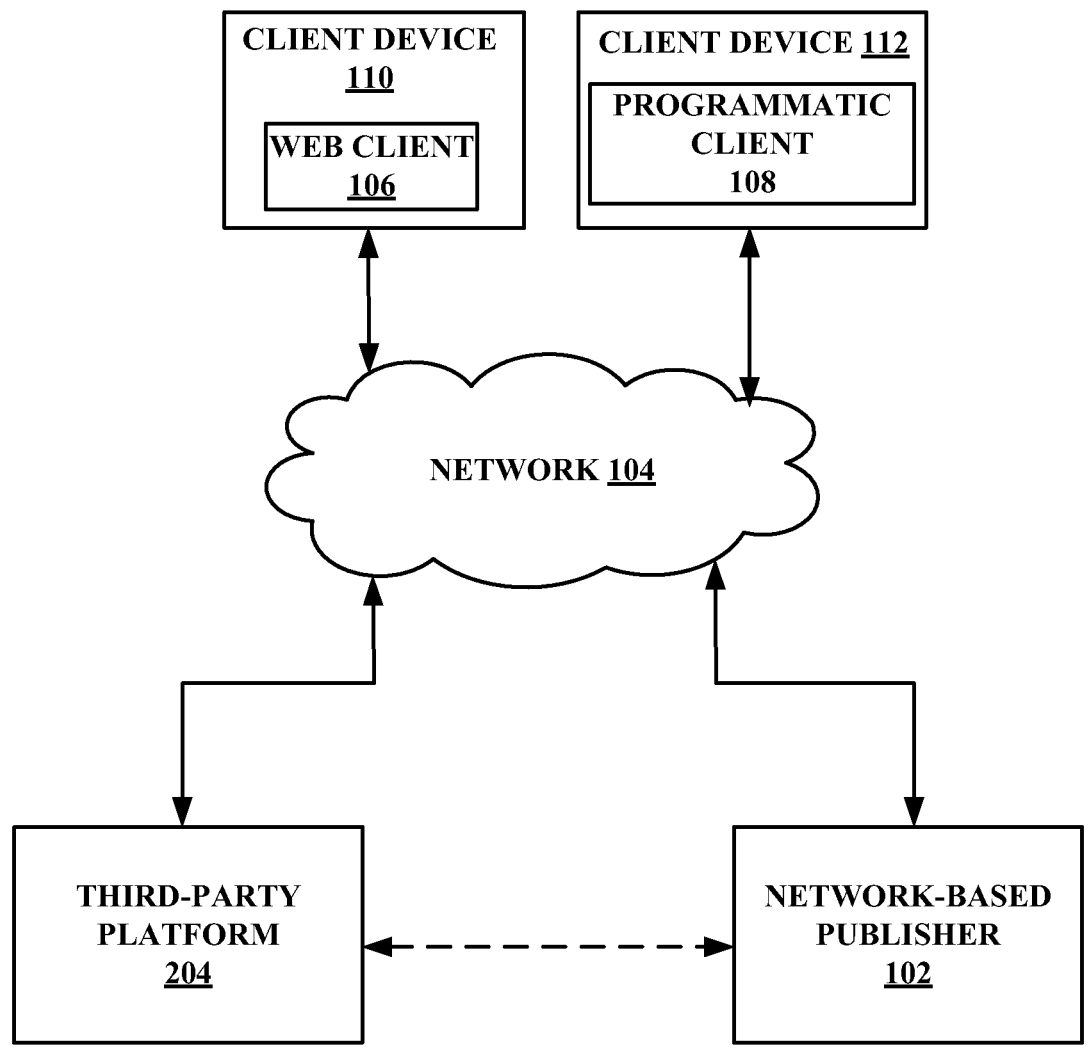
FIG. 2 is a block diagram illustrating a network environment, according to some embodiments.

FIG. 2 is a block diagram illustrating a network environment, according to some embodiments. Referring to FIG. 2, a client device 110 executing a web client 106 and a client device 112 executing a programmatic client 108 may communicate with a network-based publisher 102, as described with respect to FIG. 1, or a third-party platform 204 via the network 104. In some embodiments, the third-party platform 204 may be a social networking platform, a gaming platform, or another network-based publisher platform. In some embodiments, the network-based publisher 102 may publish content or applications (e.g., games, social networking applications) on the third-party platform 204 either directly or via the network 104. As client devices 110, 112 interact with third-party platform 204, the network-based publisher 102 may receive data pertaining to the interactions. The data may be received through the use of API calls to open a connection or transmit data between the network-based publisher 102 and the third-party platform 204.

Figure 3:
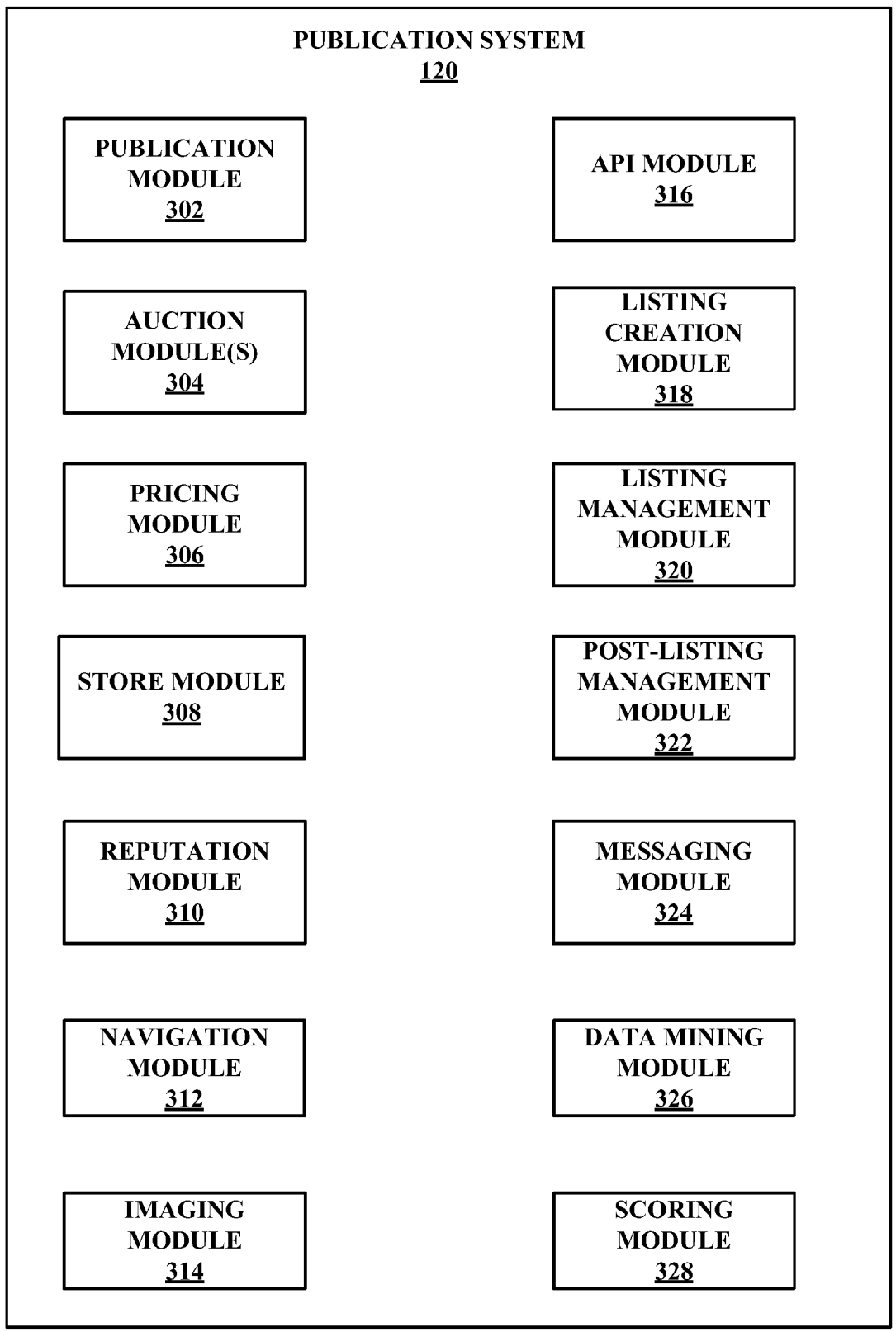
FIG. 3 is a block diagram illustrating a publication system, according to some embodiments.

Referring now to FIG. 3, an example block diagram illustrating multiple components that, in one example embodiment, are provided within the publication system 120 of the networked system 102 (see FIG. 1), is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one embodiment, the publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication module 302 and one or more auction modules 304 that support auction-format listing and price setting mechanisms (e.g., English, Dutch, Chinese, Double, reverse auctions, etc.). The various auction modules 304 also provide a number of features in support of these auction-format listings, such as a reserve price feature whereby a seller may specify a reserve price in connection with a listing and a proxy-bidding feature whereby a bidder may invoke automated proxy bidding.

A pricing module 306 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and may allow a buyer to purchase goods or services, which are also being offered for sale via an auction, for a fixed price that is typically higher than a starting price of an auction for an item.

A store module 308 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation module 310 allows users that transact, utilizing the networked system 102, to establish, build, and maintain reputations. These reputations may be made available and published to potential trading partners. Because the publication system 120 supports person-to-person trading between unknown entities, users may otherwise have no history or other reference information whereby the trustworthiness and credibility of potential trading partners may be assessed. The reputation module 310 allows a user, for example through feedback provided by one or more other transaction partners, to establish a reputation within the network-based publication system over time. Other potential trading partners may then reference the reputation for purposes of assessing credibility and trustworthiness.

Navigation of the network-based publication system may be facilitated by a navigation module 312. For example, a search module (not shown) of the navigation module 312 enables keyword searches of listings published via the publication system 120. In a further example, a browse module (not shown) of the navigation module 312 allows users to browse various category, catalog, or inventory data structures according to which listings may be classified within the publication system 120. The search module and the browse module may provide retrieved search results or browsed listings to a client device. Various other navigation applications within the navigation module 312 may be provided to supplement the searching and browsing applications.

In order to make listings available via the networked system 102 as visually informing and attractive as possible, the publication system 120 may include an imaging module 314 that enables users to upload images for inclusion within listings and to incorporate images within viewed listings. The imaging module 314 also receives image data from a user and utilizes the image data to identify an item depicted or described by the image data.

An API module 316 stores API information for various third-party platforms and interfaces. For example, the API module 316 may store API calls used to interface with a third-party platform. In the event a publication application(s) 120 is to contact a third-party application or platform, the API module 316 may provide the appropriate API call to use to initiate contact. In some embodiments, the API module 316 may receive parameters to be used for a call to a third-party application or platform and may generate the proper API call to initiate the contact.

A listing creation module 318 allows sellers to conveniently author listings of items. In one embodiment, the listings pertain to goods or services that a user (e.g., a seller) wishes to transact via the publication system 120. In other embodiments, a user may create a listing that is an advertisement or other form of publication.

A listing management module 320 allows sellers to manage such listings. Specifically, where a particular seller has authored or published a large number of listings, the management of such listings may present a challenge. The listing management module 320 provides a number of features (e.g., auto-relisting, inventory level monitors, etc.) to assist the seller in managing such listings.

A post-listing management module 322 also assists sellers with a number of activities that typically occur post-listing. For example, upon completion of an auction facilitated by the one or more auction modules 304, a seller may wish to leave feedback regarding a particular buyer. To this end, the post-listing management module 322 provides an interface to the reputation module 310 allowing the seller to conveniently provide feedback regarding multiple buyers to the reputation module 310.

A messaging module 324 is responsible for the generation and delivery of messages to users of the networked system 102. Such messages include, for example, advising users regarding the status of listings and best offers (e.g., providing an acceptance notice to a buyer who made a best offer to a seller). The messaging module 324 may utilize any one of a number of message delivery networks and platforms to deliver messages to users. For example, the messaging module 324 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

A data mining module 326 analyzes the data gathered by the publication system 102 from interactions between the client machines 110, 112 and the publication system 102. In some embodiments, the data mining module 326 also analyzes the data gathered by the publication system 102 from interactions between components of the publication system 102 and/or client machines 110, 112 and third-party platforms. The data mining module 326 uses the data to identify certain trends or patterns in the data. For example, the data mining module 326 may identify patterns which may help to improve search query processing, user profiling, and identification of relevant search results, among other things.

A scoring module 328 uses the patterns and trends identified by the data mining module 326 to score or rank a variety of data, including products, item listings, search queries, keywords, search results, and individual attributes of items, users, or products, among other things. In some embodiments, the scoring module 328 may assign a score to each piece of data based on the frequency of occurrence of the piece of data in the mined set of data. In some embodiments, the scoring module 328 may assign or adjust a score of a piece of data pertaining to an item (e.g., a keyword, a product listing, an individual attribute of the item) based on input data received from users. The score may represent a relevance of the piece of data to the item or an aspect of the item. In some embodiments, where data to be mined is gathered or received from a game, the scoring module 328 may evaluate data received from the game and assign a game score or game points to a user submitting the data. In some embodiments, the scoring module 328 may compare data received from the game to previously received and stored data from the game. The scoring module 328 may adjust the amount of points or score awarded to the user based on the comparison. For example, if the user-submitted data matches the previously stored data, the scoring module 328 may award more points to the user than if the user-submitted data does not match previously stored data.

Although the various components of the publication system 120 have been defined in terms of a variety of individual modules, a skilled artisan will recognize that many of the items can be combined or organized in other ways. Furthermore, not all components of the publication system 120 have been included in FIG. 3. In general, components, protocols, structures, and techniques not directly related to functions of example embodiments (e.g., dispute resolution engine, loyalty promotion engine, personalization engines, etc.) have not been shown or discussed in detail. The description given herein simply provides a variety of example embodiments to aid the reader in an understanding of the systems and methods used herein.

Figure 4:
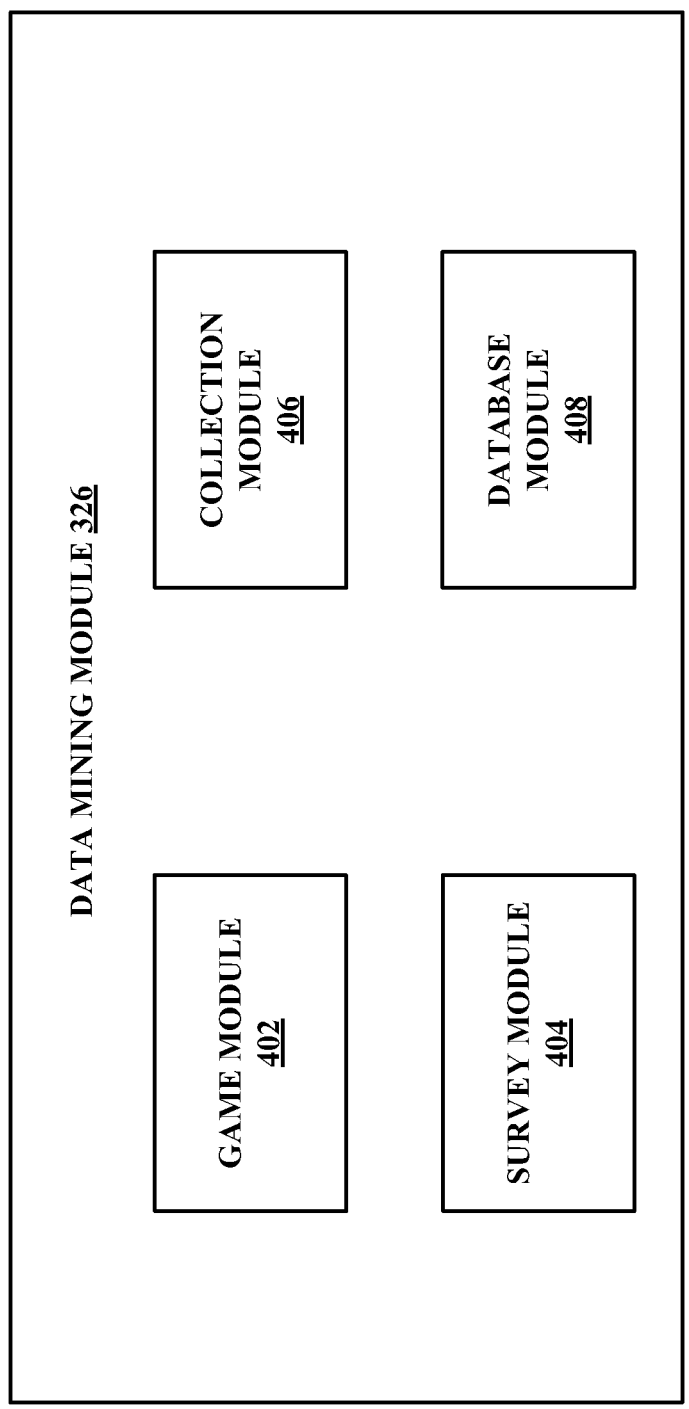
FIG. 4 is a block diagram illustrating a data mining module, according to some embodiments.

FIG. 4 is a block diagram illustrating the data mining module 326, according to some embodiments. Referring to FIG. 4, a game module 402 may store game play components used to implement a game from which data is mined. In some embodiments, instead of storing game play components, the game module 402 may interface with game play components associated with a game executing on a third party platform 204. Interfacing with game play components may entail providing data related to items about which users' opinions are solicited. For example, the game module 402 may provide text or visual data related to an item(s). The game module 402 also may receive data related to game play movements and selections and user input from a game executing on the third party platform 204. The user input may include descriptions, opinions, or other text, along with non-textual input, such as clicks, highlighting, and other interactions with the provided item text and visual data.

A survey module 404 generates a survey that is presented to a user playing a game. The survey may be presented at any point in the course of the user playing the game (e.g., prior to playing the game, at the end of the game). In some embodiments, the survey may present a set of items, including text and/or images of each item, and prompt the user to input a word or words that the user associates with each item. In some embodiments, the game module 402 or the scoring module 328 may reward the user with game points, currency, tokens, or other rewards based on the answers provided by the user. For example, if a user provides answers for each item that matches answers provided by other users, the game module 402 or the scoring module 328 may reward the user with points. In some embodiments, if the user provides answers for each item that do not match answers provided by other users, the game module 402 or the scoring module 328 may reward the user with a different amount of points (e.g., more points or less points, depending on whether the goal of the survey is to corroborate item answers or identify new answers associated with the item).

A collection module 406 collects the data received from the game. In some embodiments, the collection module 406 interfaces with the game executing on the third party platform 204 directly and collects data from the game as the data is entered by the user. In some embodiments, the collection module 406 collects the game data from the game module 402 and/or the survey module 404.

A database module 408 interfaces with one or more databases to store the data collected by the collection module 406. The database module 408 also interfaces with the one or more databases to retrieve data related to the items presented in the game and/or the survey. For example, the database module 408 may retrieve answers provided by other users related to a certain item presented in the game or survey for purposes of comparing a user's answer to previously stored answers. Based on the comparison, the game module 402 or the scoring module 328 provides a set amount of rewards to the user.

In some embodiments, the game comprises a two-dimensional game for a third party website or platform (e.g., a gaming platform, a crowdsourcing platform, or a social networking platform, such as MySpace®, Facebook®, LinkedIn®) that includes mini-games. The game may gather data via user play sessions. The mini-games are games that a player can complete quickly before moving on to another game. In some embodiments, the game world is made up of four locations: the Water Park, the Arcade, the Casino, and the Hotel. A first mini-game, Duck Sliders, based in the Water Park, is a puzzle-based matching game set on water slides. A second mini-game, Balloon Bounce, is a fast-paced shooting matching game inside the Arcade. A third mini-game, Lots O' Slots, which is in the Casino, is a luck-based slot machine game. The Hotel returns the players to the title screen. A goal for the players in the game is to amass points to appear on a high score listing presented in the game, allowing them to show off to their friends and family on the third party platform (e.g., Facebook®) and challenge them to beat their score. The three mini-games described herein are merely example embodiments; different types of games and different game designs may be employed. Any mini-games that provide entertainment to a user while collecting data related to items presented in the games may be used.

Successfully playing the Duck Sliders and Balloon Bounce games earns points for the player, and playing at the Casino nets the player even more points along with multipliers that greatly increase the amount won in a subsequent game. Although a third party website or platform (e.g., Facebook®) account is not required to play the game, only players holding an account may have their score associated with their name and stored for the high score table. This may also allow the player to resume the game from their preexisting score.

Before players can play each round of Duck Sliders or Balloon Bounce, they may be shown several items, such as products, and are required to enter information about them in the form of keywords that they may use to search for the product on an electronic commerce website, such as eBay. The keywords that the players provide are stored for subsequent players and for data mining purposes so that the relevance of specific queries to certain products may be determined. This human-powered data may aid electronic commerce websites develop tools for users of the websites.

In some embodiments, the game, including the mini-games, may be made using Adobe FLASH CS4 Professional as the engine and development environment due to the relative ease and convenience of developing a game in its two-dimensional engine rather than in a three-dimensional engine. To develop the game art, in some embodiments Adobe Photoshop CS4 is used, and the resulting art is integrated from Photoshop into FLASH.

Along with developing the front-end FLASH interface for the players to use, a backbone for the game is developed. This backbone may collect information about current items, such as products, for the game to use, as well as store the data provided by the players. In some embodiments, the products may be products listed in item listings on an electronic commerce website, such as eBay. The game may keep track of the data that users entered about different items as well as other information about the items, such as their title and description. Because of the importance of linking the product information with the data that the players may provide, a relational database that may easily make the connections is set up. In some embodiments, a MySQL database that contains several tables of data, including a master list of items, such as products, and tables of user input related to each product is used.

In some embodiments, because Actionscript 3, the programming language for FLASH, does not have built-in functions to connect to our external data source, a proxy that may read from the database as well as send the information from the database back to FLASH in an understandable format is employed. In some embodiments, PHP, a general scripting language, is used to read the data from the database using common PHP functions and then output the data to a buffer from which FLASH may read. In some embodiments where items are products listed on eBay, built-in PHP functions also are used to read data from eBay's API, which may populate the database with recent and relevant information from eBay.

In designing the game, the objectives are to create a game design that may be fun and interesting to play and be able to gather useful information from the players. According to some embodiments, there is provided an application that directly merges the data-gathering and game play components. The example embodiments provide a system in which data may be safely gathered from the user and have a purpose in the game, while not depending on the user playing an action-oriented game perfectly.

In some embodiments, the mini-games may be purely for entertainment value on their own, but may each be preceded by a quick data-gathering survey. In this survey, the user is presented with four different items, such as products that are sold on eBay, and are asked to type in a keyword or two for each product. The player is instructed to use keywords that he or she thinks may be appropriate search terms for the products and may differentiate the four of them from each other. Those keywords are collected and sent to the database, such as database 126 of FIG. 1, and then fed back into the game to be used in the mini-games. The data is used in the mini-games so that the survey and game play rounds are connected. In some embodiments, the mini-games may consist of matching the products back to the keywords the user entered for them within a game of skill. The user may have an easier time of matching the products to keywords if the keywords they entered helpfully describe the products and allow the user to easily match the item with the correct label.

Figure 5:
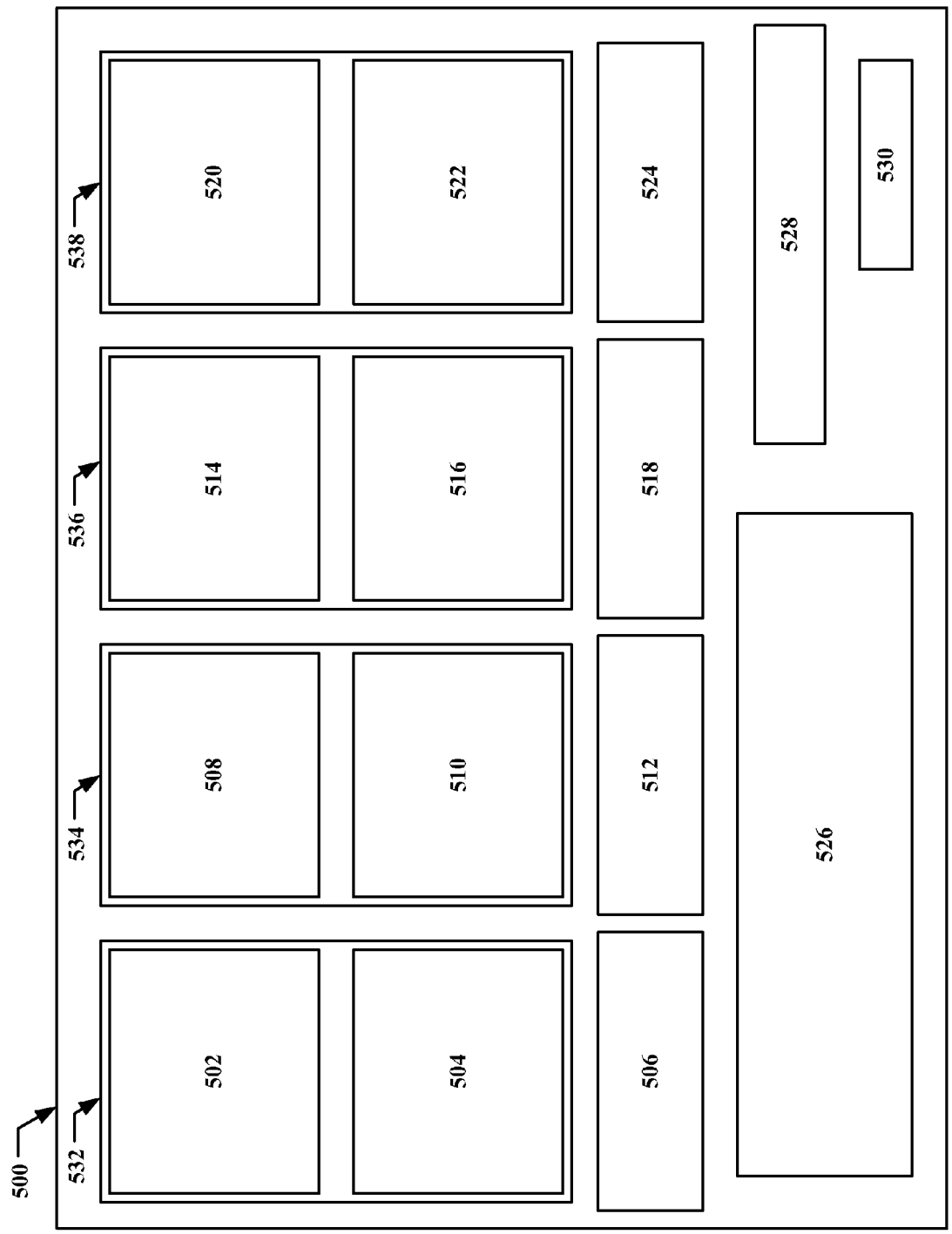
FIG. 5 is a diagram of a game from which data may be mined, according to some embodiments.

FIG. 5 is a diagram of a game from which data may be mined, according to some embodiments. In order to gather reliable data from players, the game needs a system that is relatively safe from user errors. The data mining portion of the game, according to some example embodiments, appears as a survey having a user interface showing four cards 532, 534, 536, 538. In some embodiments, the survey may be generated by the survey module 404. Each card may represent an item, such as a product available for sale on eBay, shown with its text title 504, 510, 516, 522, respectively, and a stock image, 502, 508, 514, 520, respectively, if available. Below each card is a text box 506, 512, 518, 524, respectively, into which the user can type. The user may be asked to enter a word or words into each box that may label the product and differentiate it from the others. When the user is satisfied, he or she clicks an onscreen button 530 to finalize and submit the input.

The labels that the player entered may be used in two ways. First, players receive points based on how well their input corresponds to the answers of other people. Responses for each product are recorded and kept in a persistent database, such as database 126 of FIG. 1. In some embodiments, if the player enters a label that many others agree upon, the player may earn the most points, but if the player enters a label that no one else has given, the player may earn fewer points. In this way, the player is encouraged to enter answers that they think other people may associate with the product, helping to reduce the number of made-up inputs that have nothing to do with the product. Because player inputs are recorded, it is also possible for the keywords' score ratings to change over time. Second, the entries become the labels for the goal positions in the actual mini-games. In both the Duck Sliders and Balloon Bounce mini-games, the user may be shown the four items again one at a time and have to sort them back to the labels given in the survey game. The user receives the most points if he or she correctly matches the items with their given labels. Thus, it is in the user's best interest to name the items in such a way that they can easily recognize the label that corresponds to each item. This is important to the user's success in the mini-games because the games may be time sensitive or require more skill than a simple survey. It may make it harder if the user has to struggle to remember the correct matches.

Figure 6:
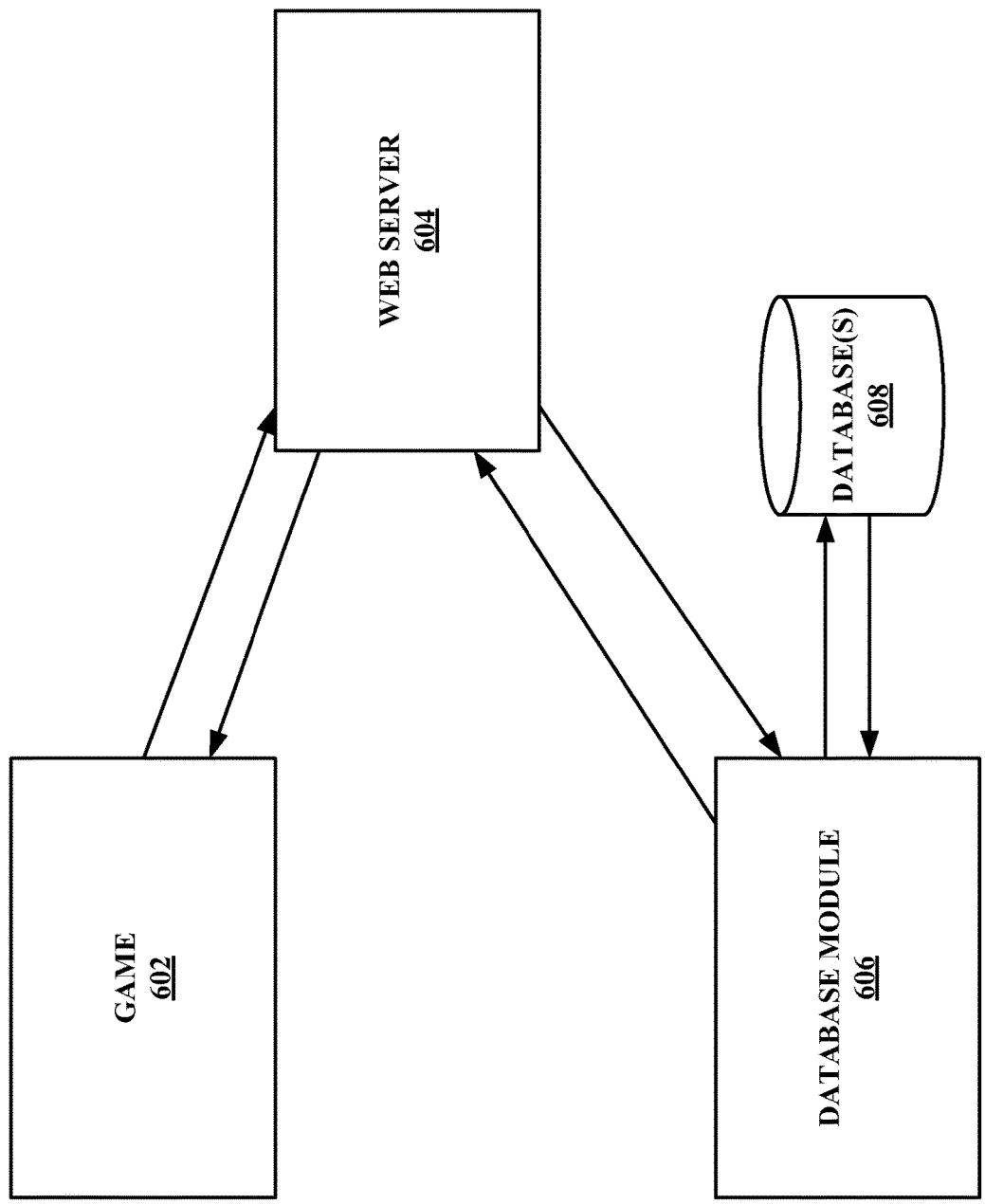
FIG. 6 is a block diagram of a network environment for communicating with a game from which data may be mined, according to some embodiments.

FIG. 6 is a block diagram of a network environment for communicating with a game 602 from which data may be mined, according to some embodiments. In order to store the game data (e.g., a player's score) and information about products, keywords, and players, the game may communicate with an outside data source to update the game 602 every time a change is made to the game. In some embodiments, however, the game 602, which in some embodiments executes in FLASH, is unable to directly communicate with a database module 606 in communication with a database 608 to run queries that retrieve and store information. Instead, the game 602 makes a request to a web server 604 to execute one of several PHP scripts, which has built-in libraries to run the desired queries on the database 608 via the database module 606. Once the web server 604 executing the script retrieves and processes the data, it then sends the data back to the game 602 to use.

In some embodiments, the database 608 stores information in several tables, which are listed and described in Table 3.1 through 3.6 below. Each time the game 602 is run, several calls are made from the game 602 (e.g., a FLASH game) to the web server 604 to execute a PHP script to properly retrieve and store the data.

TABLE 3.1

Description of database tables used by game

| Table Name | Description |
| --- | --- |
| items | Holds information about specific items recently listed on eBay |
| search_terms | Holds a list of popular search terms recently searched for on eBay. |
| products | Holds information about specific catalog products from eBay |
| product_keywords | Holds the keywords as associated with each of the products listed in products |
| high_scores | Holds information about all the players, their name and high score. |

TABLE 3.2

Description of database table "high_scores"
Table: high_scores - Player score information

| Field Name | Field Type | Field Description |
| --- | --- | --- |
| uid | BIGINT(20) | PRIMARY KEY User ID |
| first_name | VARCHAR(255) | User's first name |
| last_name | VARCHAR(255) | User's last name |
| high_score | INT(11) | User's current high score |
| score | INT(11) | User's current score |

TABLE 3.3

Description of database table "items"
Table: items - Information on eBay items

| Field Name | Field Type | Field Description |
| --- | --- | --- |
| Product_ID | BIGINT(20) | PRIMARY KEY Item ID |
| ProductName | VARCHAR(255) | Item Name |
| ProductImg | VARCHAR(255) | URL for Item image |
| keyword | VARCHAR(255) | Keyword used to get this item (see loadFromEbay.php) |

TABLE 3.4

Description of database table "productKeywords"
Table: productKeywords - Information about keyword/product relevance

| Field Name | Field Type | Field Description |
|---|---|---|
| pID | BIGINT(20) | ID for the product |
| pKeyword | VARCHAR(255) | A keyword associated with the product (Note: a product can have many keywords, each stored as separate rows) |
| pScore | FLOAT | Score for the keyword as determined by eBay (i.e. seed data) |
| count | INT(11) | Number of times the keyword has been entered in the game by all players |

TABLE 3.5

Description of database table "products"
Table: products - Information on products

| Field Name | Field Type | Field Description |
|---|---|---|
| pID | BIGINT(20) | PRIMARY KEY ID for the product |
| pTitle | VARCHAR(255) | Title of the product |
| pIMG | VARCHAR(255) | URL for the product image |

TABLE 3.6

Description of database table "search_terms"
Table: search_terms - most popular terms searched for on eBay

| Field Name | Field Type | Field Description |
|---|---|---|
| keyword | VARCHAR(255) | A keyword |

For example, when the game 602 first starts, a call is made to retrieve information on four recent items that were recently listed on eBay via a call to eBay's Finding API, which is an API that enables developers to search for items on eBay. See http://developer.ebay.com/products/finding/. The information on these items may be stored in the items table, and stored for retrieval in the Lots O' Slots game. A random keyword taken from a list of the currently most used keywords is used to search for the items. This list is retrieved by a call to eBay's Shopping API, which is an API that enables developers to retrieve search queries, among other things. See http://developer.ebay.com/products/shopping/.

In some embodiments, a game 602 implemented in FLASH may send and receive information via URL-encoded variables. In some embodiments, these variables are specially formatted name-value pairs in the form of "name1=value1&name2=value2." The FLASH game may send these pairs to a PHP script on the web server 604 via the HTTP POST method. Once the web server 604 uses PHP's built-in libraries to read the URL variables and access the database or make calls to eBay's API, the web server 604 may construct a similar URL-encoded string to send back to the FLASH game 602 containing the result data.

In some embodiments, the exchange of URL-encoded variables in the game may proceed as follows: once the player gets to the title page, the score for that player is retrieved from the database 608. The FLASH game 602, which has already received the current player's third party platform account identifier (e.g., Facebook® user id number) sends a call out to the PHP script on the web server 604 to get the player's most recent score based on the account identifier (e.g., user id) by sending the URL-encoded variable "uid=xxxx". The PHP script retrieves this score via a simple SQL query on the high_score table, and sends it back to the game 602 with the variable "score=xxxx", which the FLASH game 602 reads and updates the current player's score in-game to be "xxxx."

In some embodiments, every other script follows the format of receiving URL variables from the FLASH game 602 and processing them to send the resulting data back in the form of another set of variables. This format works very well when sending small amounts of data, such as a single score, or even listing information on a small number of items (including their product names, id numbers, and URLs for their pictures). However, problems may occur when trying to send large amounts of information such as the ID numbers, rankings, full names, and high scores for up to 11 players. The method of accessing the URL variables via POST is cumbersome for large amounts of data.

Because, in some embodiments, getting the data for showing the high score table requires this large amount of data, XML may be used. XML is a data format capable of being understood by PHP and FLASH. In some embodiments, FLASH sends a URL variable to the high score table, to indicate the current user ("uid='xxxx'"). A PHP script may query the database's high_score table to receive the top ten scores, as well as the current player's score if they are not in the top ten already. The PHP script constructs an XML file with the high score information and sends it to FLASH, where FLASH iterates through the file using ECMAScript for XML (E4X) syntax and fills in the high score table. E4X is a programming language extension that adds native XML support to ECMAScript (e.g., ActionScript, JavaScript).

Figure 7:
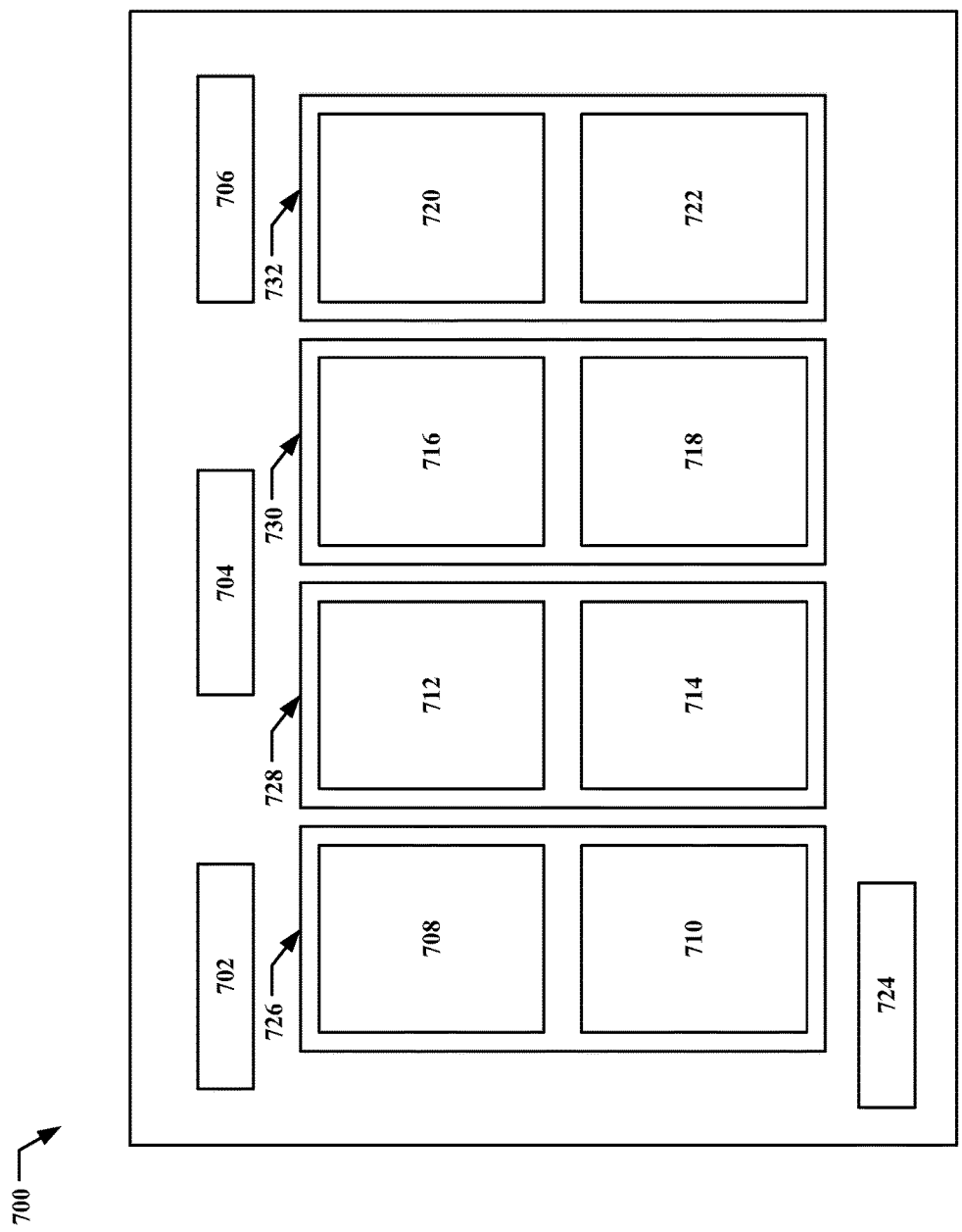
FIG. 7 is a diagram of a game from which data may be mined, according to some embodiments.

FIG. 7 is a diagram of a game from which data may be mined, according to some embodiments. FIG. 7 may represent a first example mini-game 700 corresponding to a slot machine simulation. An objective of the first mini-game 700 is to stop reels 726, 728, 730, 732 so that identical symbols line up in various formations. The player may be prompted to pay a certain number of points (e.g., 20 points) from their score to play the slot machine, but may be rewarded with more points and a bonus score multiplier that can be applied to the other mini-games. The player may score in the slot machine by stopping the reels 726, 728, 730, 732 so that they result in one of several different matching combinations, each of which gives a different score multiplier. Several examples of valid combinations include getting two, three, or four matching cards in a row, getting three matching cards anywhere on screen, and getting two different pairs of matching cards. In some embodiments, the slot machine no longer gathers any data for the game. It exists solely to entertain the player and provide a bonus for the other games.

Figure 8:
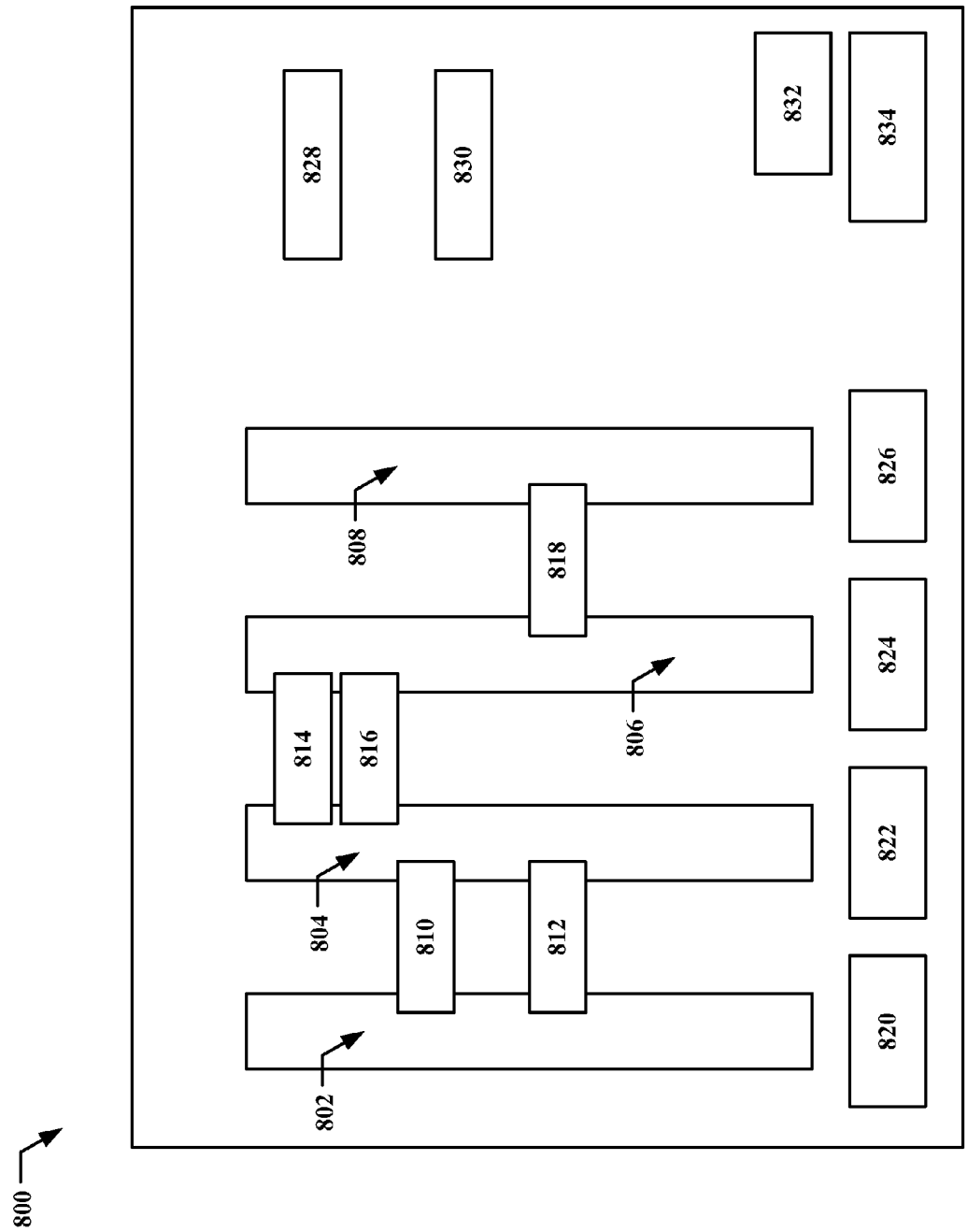
FIG. 8 is a diagram of a game from which data may be mined, according to some embodiments.

FIG. 8 is a diagram of a game from which data may be mined, according to some embodiments. FIG. 8 may represent a second example mini-game 800, in which the user matches products to keywords through a series of connected waterslides. In the game 800, four vertical slides 802, 804, 806, 808 are presented to the player, each with a keyword 820, 822, 824, 826 shown at the bottom of the vertical slide 802, 804, 806, 808. These keywords are the same ones the user supplied in the product survey before the game. Rubber ducks (not shown) appear at the top of the screen, each representing one of the items (e.g., eBay products) the user was asked to label. To avoid cluttering the screen, the item information for each duck is represented in a pop-up bubble that only appears when the user moves his or her input device (e.g., mouse) over the duck. The goal is to guide each duck down the screen so that it lands on the keyword that matches its item. When a duck begins moving, it moves straight down its slide towards the bottom of the screen. Every time a duck encounters a connecting pipe (e.g., 810, 812, 814, 816, or 818), the duck may cross over the connecting pipe to the connected slide 802, 804, 806, 808 before continuing downwards. The player has a limited amount of time to place pipes between each of the slides 802, 804, 806, 808 to create an interconnected pathway for the ducks to follow. When time runs out, the duck starts moving down its slide. The ducks go down one at a time, and the user cannot place pipes while a duck is in motion. Furthermore, the pipes placed down remain on the field for the remaining ducks, creating a slightly more complex system for the user to create a path through. By placing pipes in the proper locations, the user can determine where each duck may land at the bottom. The player earns points based on how many ducks they correctly matched to the proper keywords.

In some embodiments, the second mini-game 800 may be implemented so that the player does not place the pipes in between the waterfalls themselves. Instead, the pipes are automatically generated and placed on the field beforehand. The player may have an infinite amount of time to swap the starting locations of the ducks at the top of the screen before pressing a button send them all down at once.

Figure 9:
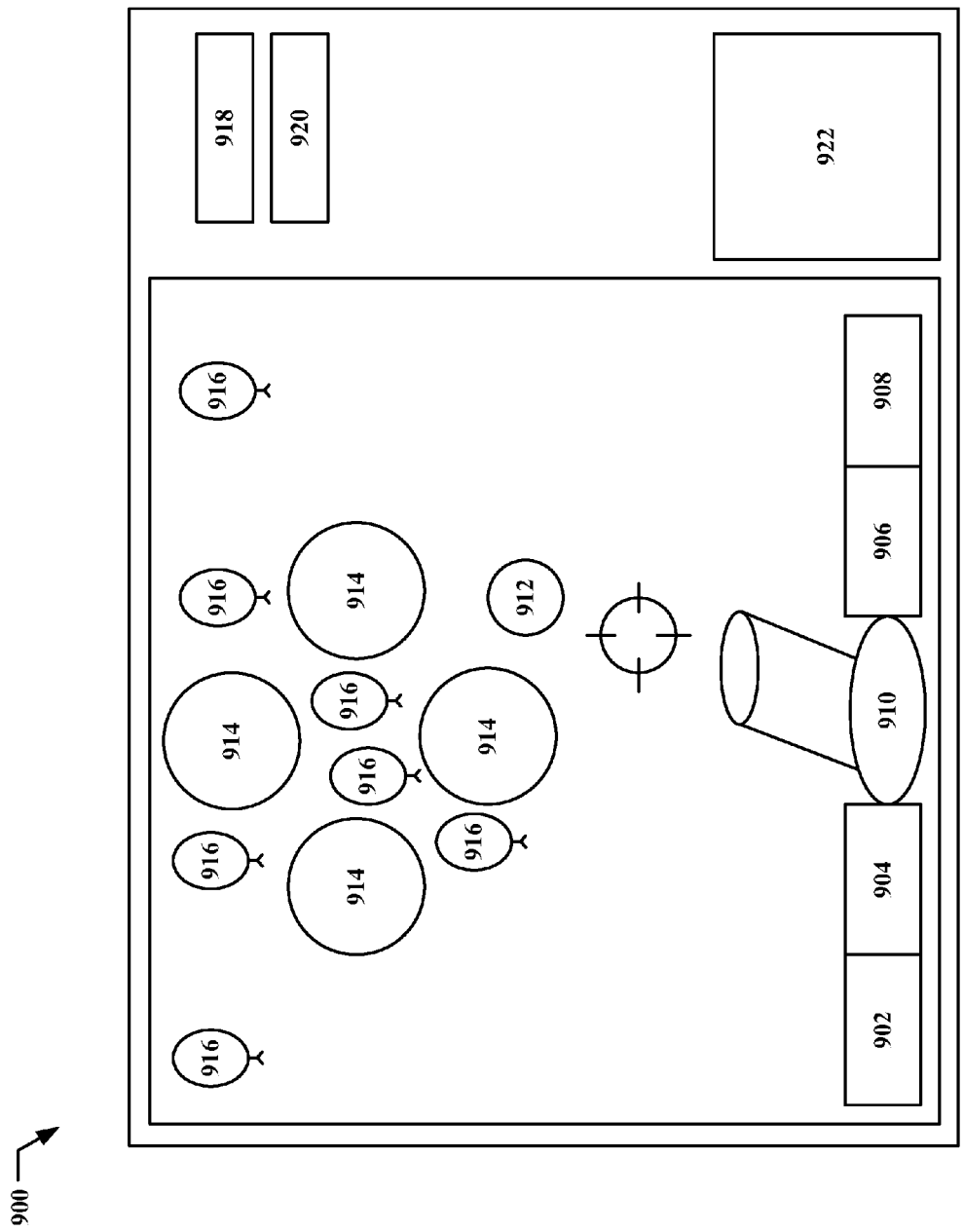
FIG. 9 is a diagram of a game from which data may be mined, according to some embodiments.

FIG. 9 is a diagram of a game from which data may be mined, according to some embodiments. FIG. 9 may represent a third example mini-game 900 in the form of a more action-oriented arcade-style game. Like the second mini-game 800, the user matches items (e.g., eBay products) back to the labels given to them in the data-mining survey. However, this time the matching is done through the medium of a bouncing ball game. Each of the four items (e.g., products) is represented by a colored ball 912, and each label is shown on one of four bins 902, 904, 906, 908 at the bottom of the screen. The player must launch each ball 912 onto the playing field and bounce it off the walls so that it lands in the proper bin. The player can shoot them with projectiles in order to change the course of the balls while they are on the field. The field is also populated with floating bubbles 916 and solid bumpers 914. The player's goal is to pop as many bubbles 916 as possible with each ball 912 before guiding it into the correct bin 902, 904, 906, 908. The player earns points based on how many bubbles 916 they popped and whether or not they put the ball 912 into the correct bin 902, 904, 906, 908. The ball 912 ricochets off of walls and bumpers 914 perfectly, with no loss of speed. There are multiple configurations for the bubbles 916 and bumpers 914 on the field, which reset and change for each ball 912.

For the third mini-game 900, the electronic commerce website's (e.g., eBay) sponsorship across the game 900 is displayed using the primary colors of the sponsoring electronic commerce website. For example, where eBay is the sponsor, most of the art focused on eBay's four primary colors: red (R:255, G:0, B:0), blue (R:0, G:0, B:153), yellow (R:255, G:204, B:0) and green (R:153, G:204, B:0) may be used.

Music for the mini-games may be created using Apple GarageBand, which uses unique combinations of built-in loops. Each song is created to immerse the player further into the game, adding another dimension to the look of the games.

Figure 10:
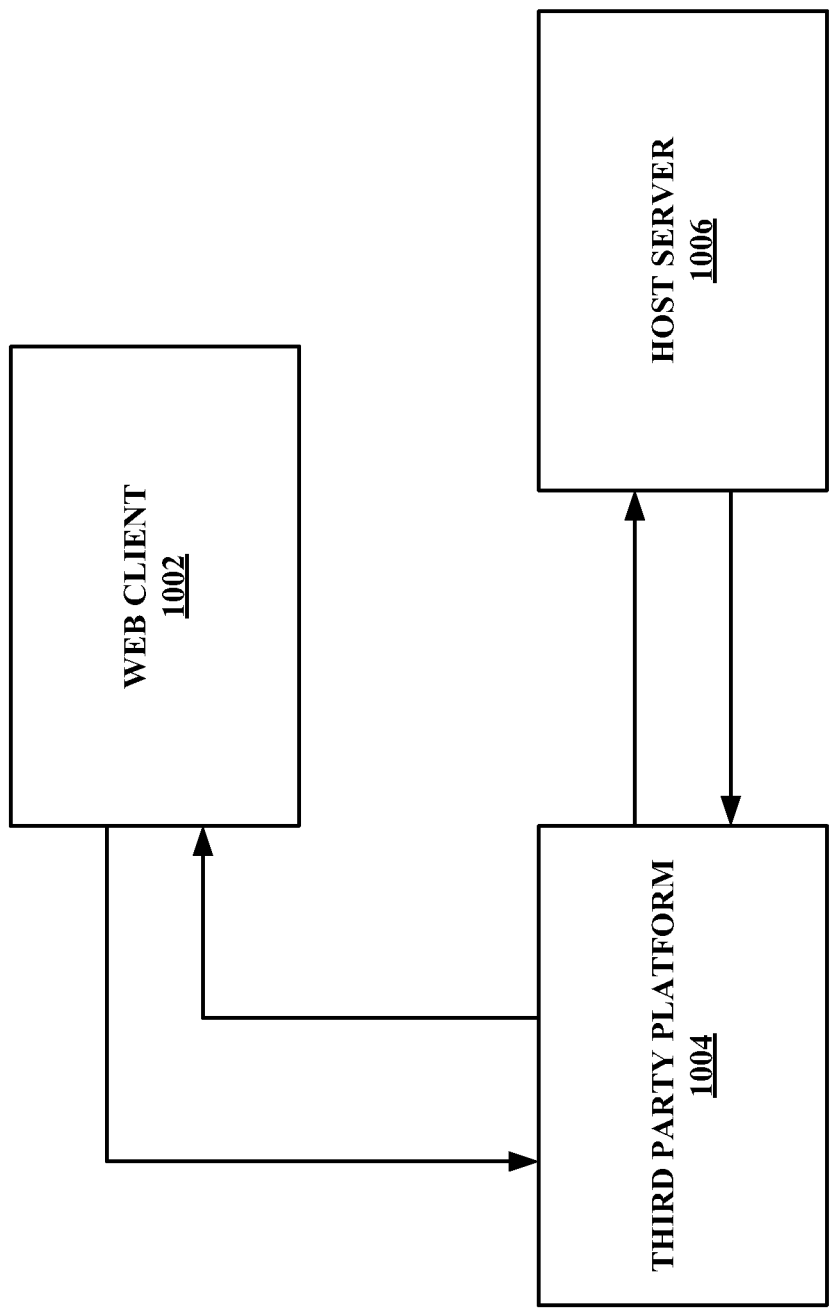
FIG. 10 is a block diagram of a network environment for communicating with a game from which data may be mined, according to some embodiments.

FIG. 10 is a block diagram of a network environment for communicating with a game from which data may be mined, according to some embodiments. In some embodiments disclosed herein, the game and its mini-games are deployed on a third-party platform 1004 (e.g., a social networking platform, a gaming platform, a crowdsourcing platform). In order to deploy the game on a third party platform 1004 (e.g., Facebook®) in a way to obtain information about the user of the third party platform, first, the game application is created on the third party platform 1004. In the case of the game being deployed on Facebook®, the game is given program access to Facebook's® API via an API key and another key that Facebook® calls the "Application Secret." Next, the main page for the game application, which may be referred to as the "canvas page," is set up. To set up the "canvas page," a host server 1006 sets up a web page to display the game, and then the settings of the game application are edited so that the third party platform 1004 (e.g., Facebook®) may load that page since certain third party platforms 1004 (e.g., Facebook®) typically do not host any application content on its own servers.

Once the page that displayed the game is loaded on Facebook®, Facebook's® Client Libraries are used in order to obtain information about the currently logged in user. Using the PHP client library, the canvas page is able to retrieve the ID number of the currently logged in user. To handle users who are not logged into Facebook® and let them play the game even though they cannot save their scores, if an ID number is not retrieved using the PHP client library, an assumption may be made that there is no logged in user.

Once an ID number is retrieved, a call is made to Facebook's API to retrieve more information about the user, specifically their name, which is separated into first_name and last_name properties. The id number and the name of the user are passed to the game so that the game knows who is currently playing it. Since the id number and name are determined before the game loads, a way to send the information to the game is through a property called "flashvars." This property is set in the HTML code embedding the FLASH file to the web page, and also uses the same URL-encoded variable scheme that the other scripts used (in this case "uid=xxxx&first_name=xxxx&last_name=xxxx"). FLASH reads these variables just in the same way as it reads the URL variables from PHP, and stores them to use in the rest of the game.

Thus, example embodiments disclose games that take text input from a user in order to determine the words that best relate to given items (e.g., products, electronic commerce items). The user's input is recorded in a game database, allowing an electronic commerce provider (e.g., eBay) to persistently collect the results of people's game play.

In some embodiments, a system is implemented where players may exchange their earned points for virtual items. Allowing the player to persistently collect items may have expanded both the game and the player's experience by increasing the replay value and addictiveness of the game. In some embodiments, a virtual environment where the player can organize all their "purchased" goods may personalize the game further for the player. Goals for collecting particular virtual products, or as many as possible, may come into play and extend the amount of time the game is played more than if the only encouragement the player has is the acquisition of a high score. The products may have come from actual eBay items being sold on the website. However, because of the enormous variety of items available, the virtual versions may have been generalizations of their real-life counterparts. For example, a new pair of size six women's puma brand sneakers may be simply a pair of sneakers in its virtual version. Although this method makes the selection of virtual products somewhat more limited, adding the ability to customize the colors and styles may easily overcome this limitation without labeling the product to its specific original description.

In some embodiments an encompassing larger game is included. The games created may act as mini-games in the larger game. The creation of the larger game may deepen the connection between the mini-games and may force the player into playing each mini-game, rather than having the player ignore one or two mini-games. Taking the focus off of the mini-games may also immerse the players further into the game and may better disguise the data-collection portion.

In some embodiments, the game may be moved or migrated onto other third party platforms. Although the players do not need a third party platform account (e.g., Facebook® account) and only the players with accounts may have their score saved and recorded, this feature may cause limitations. The players without accounts may be turned off from the idea of replaying the game from the starting score, especially with no recognition on the high score board. To solve this, the game may be published on multiple platforms and devices, such as the Apple iPhone®.

Figure 11:
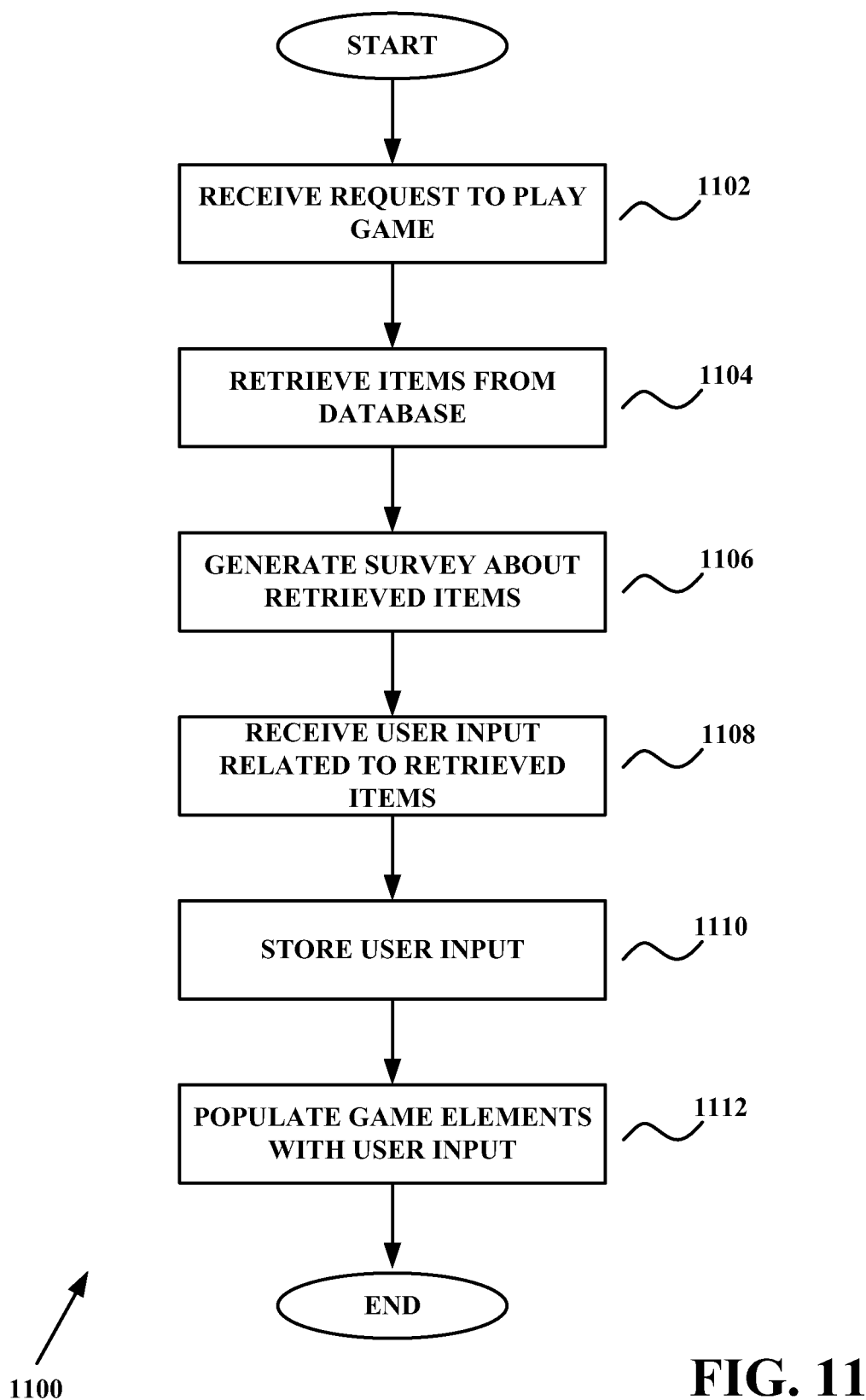
FIG. 11 is a flow diagram of an example method for mining data from a game, according to some embodiments.

FIG. 11 is a flow diagram of an example method 1100 for mining data from a game, according to some embodiments. At operation 1102, a request from a user to play a game is received. The user may choose to play the game on a third party platform, such as a social networking platform, a gaming platform, or a crowdsourcing platform. In response to the selection of the game by the user, a request may be transmitted in the form of a request or an API call from the game executing on a third party platform to a web server or application server hosting game components and data, data related to items, or both. In some embodiments, the request may be a search request or a request directed to a script that performs a search of a data structure or database storing a data related to items.

At operation 1104, data related to items, such as products, may be retrieved from the data structure or database. The web server or application server may receive the retrieved data and return the retrieved data to the game. In some embodiments, the data related to the items may include text and images describing the items. In some embodiments, the text may be data from a listing offering the item for sale on an electronic commerce website, such as a title, a description of the item, and captions for images illustrating the item.

At operation 1106, the web server or application server may generate a survey, quiz, or other data gathering mechanism to be displayed during the course of the game. For example, the survey may be displayed prior to the start of the game. The survey may incorporate the retrieved data pertaining to the items and prompt the user to input data related to the items presented in the survey. In some embodiments, the survey may be generated by the third party platform. In some embodiments, survey components and data may be transmitted from the web server or application server to the third party platform to be included or used by the third party platform to generate the survey. In some embodiments, the survey or other data gathering mechanism may present the item data to a user and include survey elements that prompt a user to input data related to the items. In some embodiments, the survey elements include freeform text boxes, question and answer elements, check boxes, and other selectable user interface elements capable of representing an answer or opinion of a user.

At operation 1108, user input related to the item data presented in the survey may be received from the game. User input may include words or other indications representing opinions or answers of a user. For example, the survey may present an image of an item to a user, and the received user input may comprise one or more words describing the item according to the user. At operation 1110, the user input received from the game may be stored in a database. In some embodiments, the user input may be stored in a table, with each piece of user input being stored in association with the item to which it refers. For example, a database table may store an item and the user input associated with the item together in a record or name-value pair. For games built using Adobe FLASH, calls may be made from FLASH to a web server to execute PHP or other scripts to retrieve and store data in the database.

At operation 1112, the received user input may be inserted into the game or may be populated in one or more game elements. Thus, when a user plays the game, the user may be exposed to the same user input data entered in the survey. The user input data may be inserted or incorporated into the game in a way that requires the user to interact with the user input data to progress in the game or to obtain points in the game, thereby motivating the user to enter answers accurately reflecting the user's opinions about the items.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It may be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it may be appreciated that that both hardware and software architectures require consideration. Specifically, it may be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
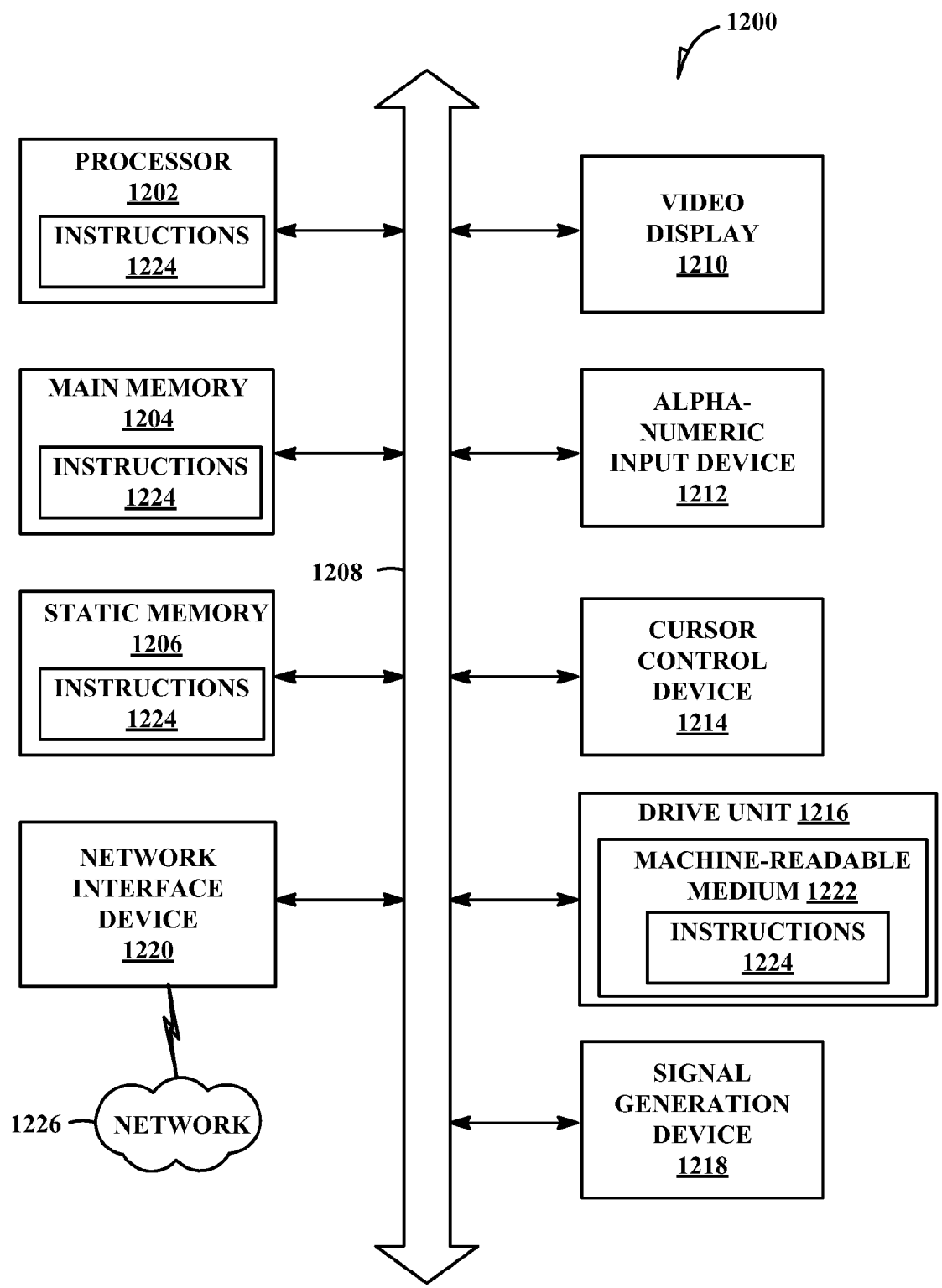
FIG. 12 is a simplified block diagram of a machine in an example form of a computing system within which a set of instructions for causing the machine to perform any one or more of the methodologies discussed herein may be executed.

FIG. 12 is a block diagram of machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it may be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, may be apparent to those of skill in the art upon reviewing the above description.

What is claimed is:

1. A system, comprising:
   processors; and
   a memory storing instructions that, when executed by at least one processor among the processors, cause the system to perform operations comprising:
   receiving a selection of a game by a user from a user device;
   in response to receiving the selection of the game, retrieving item data related to an item from a database, the item data including at least an image that depicts the item from the database;
   generating a survey based on the retrieved item data related to the item for presentation in the game, the survey including a presentation of the image that depicts the item from the database;
   prompting the user to provide a user input into the survey, the user input including a keyword that the user associates with the item depicted by the presentation of the image;
   in response to the user input including the keyword, adjusting a score associated with the keyword, the score indicating a relevance of the keyword to the item;
   storing the user input and the item data in the database; and
   incorporating the user input into the game such that the user interacts with the user input as part of playing the game.

2. The system of claim 1, wherein the item data includes at least one of text describing the item and an image of the item.

3. The system of claim 1, wherein the item is a product offered for sale on an electronic commerce website.

4. The system of claim 1, wherein the operations further comprise:
   comparing the user input received from the user with previously stored user inputs received from other users, and award an amount of game points to the user based on the comparison.

5. The system of claim 1, wherein the game is executed on a third party platform, the third party platform being at least one of a social networking platform, a gaming platform, or a crowdsourcing platform.

6. A computer-implemented method, comprising:
receiving a selection of a game by a user from a user device;
in response to receiving the selection of the game, retrieving item data related to an item from a database, the item data including at least an image that depicts the item from the database;
generating, by at least one processor, a survey based on the retrieved item data related to the item for presentation in the game, the survey including a presentation of the image that depicts the item from the database;
prompting the user to provide a user input into the survey, the user input including a keyword that the user associates with the item depicted by the presentation of the image;
in response to the user input including the keyword, adjusting a score associated with the keyword, the score indicating a relevance of the keyword to the item;
storing the user input and the item data in the database; and
incorporating the user input data into the game such that the user interacts with the user input as part of playing the game.

7. The computer-implemented method of claim 6, wherein the item data includes at least one of text describing the item and an image of the item.

8. The computer-implemented method of claim 6, wherein the item is a product offered for sale on an electronic commerce website.

9. The computer-implemented method of claim 6, further comprising:
comparing the user input received from the user to previously stored user inputs received from other users, and awarding an amount of game points to the user based on the comparison.

10. The computer-implemented method of claim 6, wherein the game is executed on a third party platform, the third party platform being at least one of a social networking platform, a gaming platform, and a crowdsourcing platform.

11. A non-transitory machine-readable storage medium storing a set of instructions that, when executed by at least one processor of a machine, causes the machine to perform operations comprising:
receiving a selection of a game by a user from a user device;
in response to receiving the selection of the game, retrieving item data related to an item from a database, the item data including at least an image that depicts the item from the database;
generating a survey based on the item data related to the item for presentation in the game, the survey including a presentation of the image that depicts the item from the database;
prompting the user to provide a user input into the survey, the user input including a keyword that the user associates with the item depicted by the presentation of the image;
in response to the user input including the keyword, adjusting a score associated with the keyword, the score indicating a relevance of the keyword to the item;
storing the user input and the item data in the database; and
incorporating the user input into the game such that the user interacts with the user input as part of playing the game.

12. The machine-readable storage medium of claim 11, wherein the item data includes at least one of text describing the item and an image of the item.

13. The machine-readable storage medium of claim 11, wherein the item is a product offered for sale on an electronic commerce website.

14. The machine-readable storage medium of claim 11, wherein the operations further comprise:
comparing the user input received from the user to previously stored user inputs received from other users, and awarding an amount of game points to the user based on the comparison.

15. The machine-readable storage medium of claim 11, wherein the game is executed on a third party platform, the third party platform being at least one of a social networking platform, a gaming platform, and a crowdsourcing platform.

16. The system of claim 1, wherein the operations further comprise:
retrieving previously stored user inputs provided by other users related to the item presented in the game or survey for purposes of comparing a user's user input to previously stored user inputs.

17. The computer-implemented method of claim 6, further comprising retrieving previously stored user inputs provided by other users related to the item presented in the game or survey for purposes of comparing a user's user input to previously stored user inputs.

18. The non-transitory machine-readable storage medium of claim 11, wherein the operations further comprise retrieving previously stored user inputs provided by other users related to the item presented in the game or survey for purposes of comparing a user's user input to the previously stored user inputs.

* * * * *